(12) United States Patent
Schneidmiller

(10) Patent No.: US 8,051,600 B2
(45) Date of Patent: Nov. 8, 2011

(54) FLYING INSECT TRAP WITH SPACED ENTRYWAYS

(75) Inventor: Rodney G. Schneidmiller, Greenacres, WA (US)

(73) Assignee: Sterling International Inc., Spokane, WA (US)

( * ) Notice: Subject to any disclaimer, the term of this patent is extended or adjusted under 35 U.S.C. 154(b) by 556 days.

(21) Appl. No.: 12/200,820

(22) Filed: Aug. 28, 2008

(65) Prior Publication Data
US 2009/0151228 A1 Jun. 18, 2009

Related U.S. Application Data

(60) Provisional application No. 61/013,936, filed on Dec. 14, 2007.

(51) Int. Cl.
*A01M 1/10* (2006.01)
(52) U.S. Cl. .............................. 43/122; 43/133
(58) Field of Classification Search ................... 43/107, 43/122, 132.1, 133
See application file for complete search history.

(56) References Cited

U.S. PATENT DOCUMENTS

| | | | |
|---|---|---|---|
| 38,277 A | 4/1863 | Bassett | |
| 149,918 A | 4/1874 | Clough | |
| 218,175 A | 8/1879 | Hollingshead | |
| 836,052 A | 11/1906 | Pool | |
| 862,079 A | 7/1907 | Lenthier | |
| 1,131,120 A * | 3/1915 | Crawford | 43/122 |
| 1,544,334 A * | 6/1925 | Martin | 43/119 |
| 3,059,373 A | 10/1962 | Gardner | |
| 3,320,692 A | 5/1967 | Hellen | |
| 3,885,341 A | 5/1975 | Kuchenbecker | |
| 4,044,494 A | 8/1977 | Grajnert | |
| 4,551,941 A | 11/1985 | Schneidmiller | |
| 4,876,822 A | 10/1989 | White | |
| 5,522,171 A | 6/1996 | Mandeville | |
| 5,557,880 A | 9/1996 | Schneidmiller | |
| 6,158,165 A | 12/2000 | Wilson | |
| 6,289,629 B2 | 9/2001 | Greening | |
| 6,910,298 B2 | 6/2005 | Schneidmiller | |
| 7,412,797 B1 | 8/2008 | Hiscox | |
| 2005/0028430 A1 | 2/2005 | Schneidmiller | |

FOREIGN PATENT DOCUMENTS

| | | |
|---|---|---|
| JP | 08-322448 A | 12/1996 |
| JP | 09-252700 A | 9/1997 |

OTHER PUBLICATIONS

International Search Report and Written Opinion dated Mar. 13, 2009, issued in corresponding PCT/US2008/074690, filed Aug. 28, 2008, 7 pages.
Extended European Search Report mailed Feb. 7, 2011, issued in corresponding European Application No. EF08798913.3, filed Aug. 28, 2008, 5 pages.

* cited by examiner

*Primary Examiner* — Joshua Michener
(74) *Attorney, Agent, or Firm* — Christensen O'Connor Johnson Kindness PLLC

(57) ABSTRACT

An insect trap (100) with spaced apart first and second entry structures (120, 140), includes an entrapment chamber (100) having a first compartment (102) and a second compartment (104) separated from the first compartment with a transverse panel (106). A conical first tapered guide (126) extends from the first entry structure into the first compartment, and a second tapered guide (146) extends from the second entry structure to the second compartment. The guides encourage the target insects to venture further into the trap, while hindering egress from the trap. One or more of the compartments include means for retaining an attractant. Traps having more than two compartments with spaced apart entryways are also disclosed.

22 Claims, 5 Drawing Sheets

FLYING INSECT TRAP WITH SPACED ENTRYWAYS

CROSS-REFERENCE TO RELATED APPLICATION

This application claims the benefit of U.S. Provisional Patent Application No. 61/013,936, filed Dec. 14, 2007, the disclosure of which is hereby expressly incorporated by reference in its entirety, and priority from the filing date of which is hereby claimed under 35 U.S.C. §119.

BACKGROUND

Flying insects, for example, various social wasps, including paper wasps, hornets and yellow jackets, can be a significant nuisance and a potential hazard to people and animals engaged in outdoor activities. Such flying insects can be prevalent in rural settings and even in very well developed residential areas. Various species of insects, flying and otherwise, are also common in agricultural settings and in other commercial processing venues, including for example meat packing factories, food processing facilities, and livestock ranches.

Traps for flying insects are known in the art and often have been quite successful at trapping target insects. For example, the inventor of the insect trap disclosed herein pioneered conical element hanging traps, such as the wasp traps described and claimed in U.S. Pat. No. 4,551,941, which issued on Nov. 12, 1985, to Schneidmiller, and which is hereby incorporated by reference in its entirety. Schneidmiller discloses a transparent cylindrical insect trap that is selective to entrapping wasps. A "wasp" is a generic name applied to insects of the order Hymenoptera, which includes particularly paper wasps, hornets and yellow jackets. The present inventor also discloses certain improvements to the insect trap in U.S. Pat. No. 5,557,880, also incorporated herein by reference in its entirety.

Previously patented trap structures include a transparent, generally cylindrical entrapment chamber that is open at the bottom, and a base that attaches to the bottom of the entrapment chamber, and defines one or more entryways for the target insect. In the prior art device, the entrapment chamber also includes ventilation openings at the top end of the cylindrical entrapment chamber. The entryways in the base are apertures that permit and encourage entry into the entrapment chamber by wasps. An entry cone shaped as a truncated cone or tapered guide, is disposed in the entrapment chamber. The tapered guide is open at the bottom, which is directly adjacent to the perimeter at the bottom of the entrapment chamber, and includes a smaller open aperture at the top end of the tapered guide. Wasps or other target insects enter the trap through the entryways, and fly or climb into the cone, passing through the smaller aperture in its truncated upper end. The target insect thereby becomes entrapped in the cylindrical chamber. Once the target insect is inside the chamber, exiting is highly improbable.

Insect traps may utilize one or more attractants to lure target insects into the trap. The attractant may be as simple as water, or may be a chemical attractant that is targeted to a particular species. For example, the attractant may be an olfactory attractant for the target insect. In one embodiment, the attractant is a volatile attractant formed into a solid with a polyurethane matrix, such that the attractant will evaporate and escape from the matrix over a period of time. The attractant may combine water with a volatile olfactory attractant, wherein the volatile olfactory attractant mixes with vapors from a chemical attractant and/or water in a separate container, the mixed vapors exiting the trap in a plume. An effective attractant plume will attract the target insects toward the trap, and in particular toward the trap entryway. Various attractants or combination of attractants may be used, including both solid and liquid attractants, providing great flexibility in selecting from a range and combination of attractants.

Portions of the trap may be colored and/or reflective to visually attract one or more target insects, and/or a volatile olfactory attractant may be provided to aid in attracting the target insect(s). Any such coloring and attractant may be selected to entice or attract a particular species of insect, providing a high degree of selectivity to the trap.

However, it is known that certain species of insects are territorial, and/or do not co-mingle. Members of a territorial insect species may be mutually or unilaterally antagonistic and/or repulsive toward other insect species. Sometimes mutually antagonistic species share a common environment (such as a residential yard, an orchard, a field, a wooded area, or the like) but avoid or repel each other when they come into close proximity. In such cases, conventional insect traps may be ineffective for one or more desired target species due to the close-proximity repulsion between target species.

However, it is inconvenient, costly and/or unsightly to set out multiple traps in order to attract and entrap multiple species of insects. There remains a need, therefore, for improvements in insect traps that are suitable for entrapping more than one species of insect.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An insect trap is disclosed having an entrapment chamber defining more than one chamber for entrapping insects. The compartments have open ends that are spaced apart from each other. An entry structure is attached to the open end of each compartment, the entry structure defining entry apertures for insect access to the individual compartments. By providing a single trap with spaced apart entries, different insects may be attracted and entrapped, even if the species are not typically disposed to be in close proximity to each other.

In an embodiment, the entry structure is spaced at least six inches from the second entry structure.

One or more of the different compartments may contain an insect attractant that is directed to a particular target insect, and wherein the attractant generates a plume that emanates from the associated entry structure. A second compartment may contain a second insect attractant that generates a second attractant plume that emanates from the second entry structure. In particular, the first insect attractant may be targeted to a different species of insect than the second insect attractant.

In a current embodiment, the insect trap includes one or more tapered guides extending from the entry structure into the associate compartment. The tapered guides, which may be generally conical, have a large open proximal end that overlies the associated entry apertures, and a small open distal end. The tapered guide may include a plurality of apertures to encourage the target insect to enter the trap, but are small enough to inhibit escape.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Various traps for insects, and particularly for flying insects, are known in the art. An exemplary trap for wasps and related insects is disclosed in U.S. patent application Ser. No. 12/052,663, filed on Mar. 20, 2008, now U.S. Pat. No. 7,886,481, which is hereby incorporated by reference in its entirety.

Figure 1:
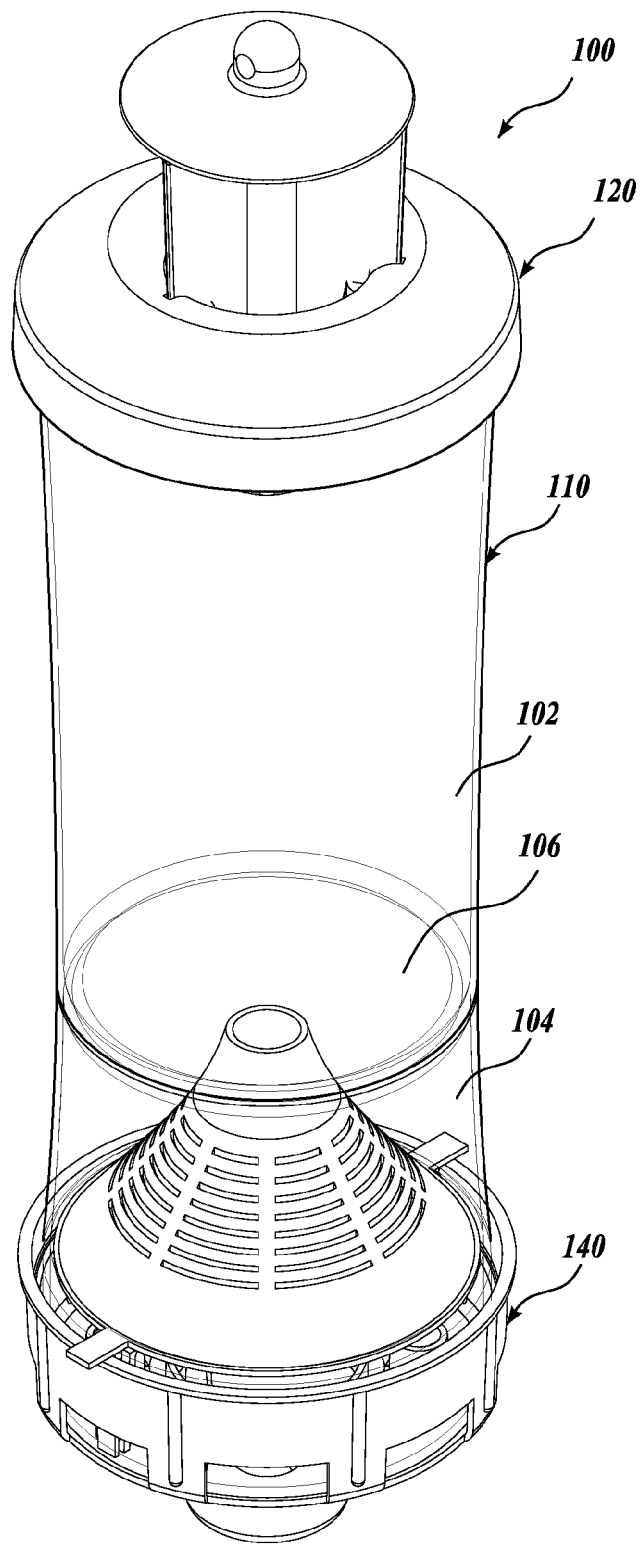
FIG. 1 is a perspective view of a first embodiment of a flying insect trap in accordance with the teachings of the present invention.
Figure 2:
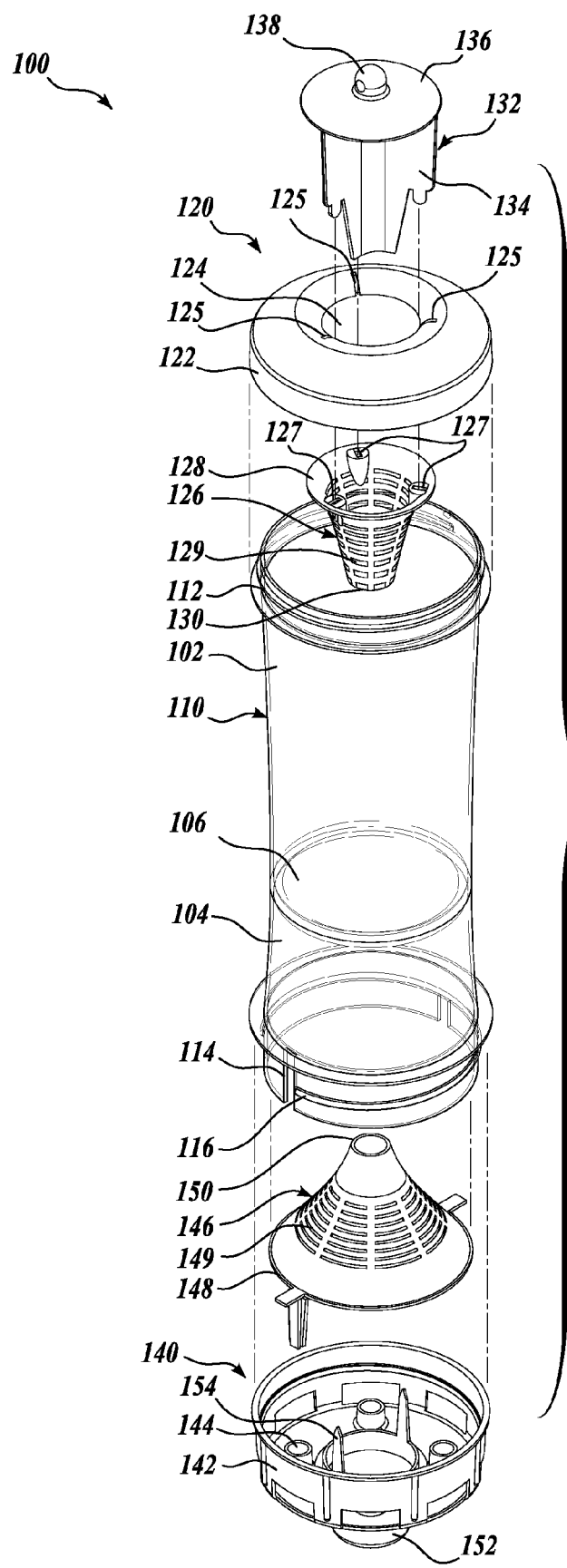
FIG. 2 is an exploded view of the flying insect trap shown in FIG. 1.
Figure 3:
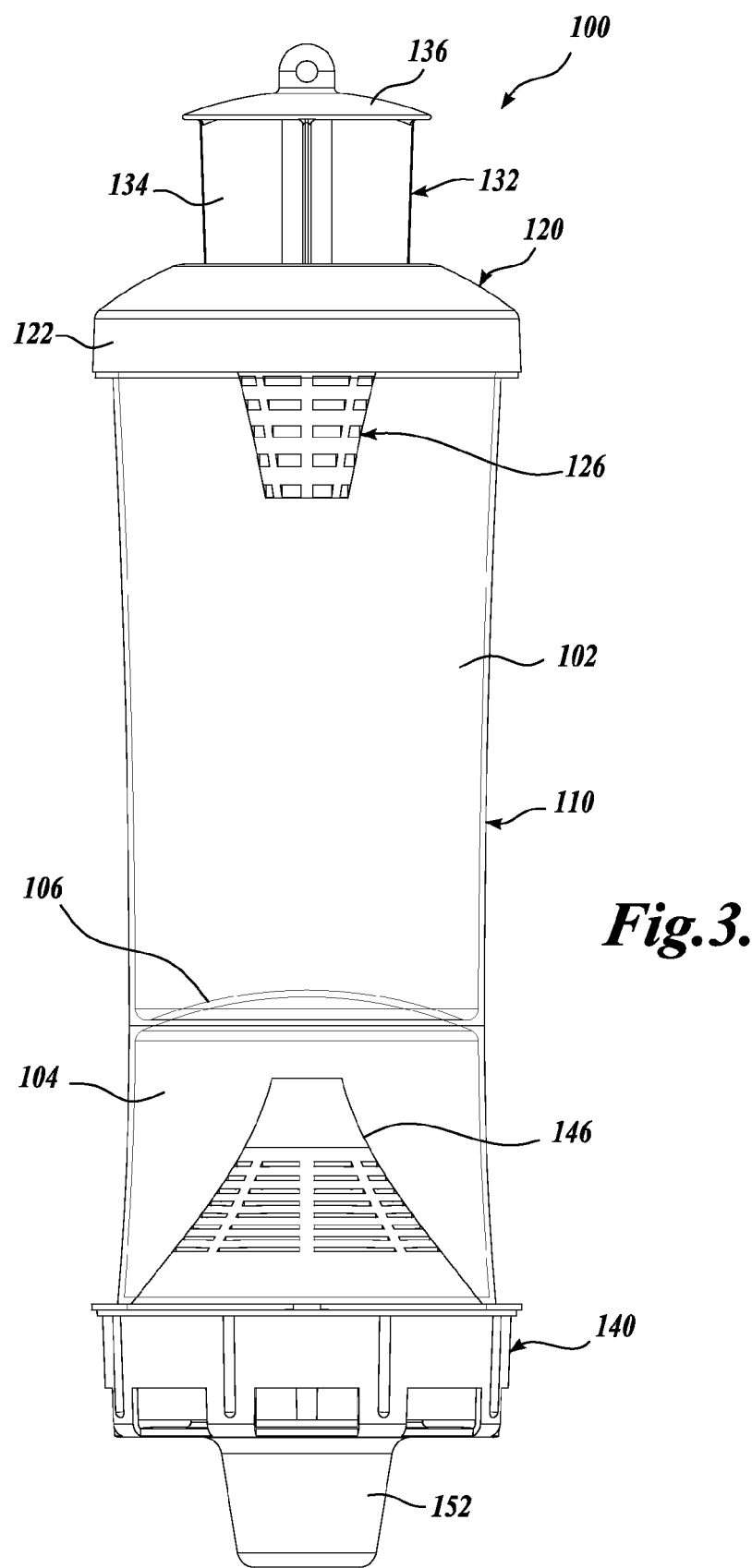
FIG. 3 is a side view of the flying insect trap shown in FIG. 1.

A perspective view of an exemplary multi-species insect trap 100 in accordance with the present invention is shown in FIG. 1. An exploded view of the multi-species insect trap 100 is shown in FIG. 2, and a side view is shown in FIG. 3. The insect trap 100 includes an entrapment chamber 110, which may preferably be transparent or translucent. The entrapment chamber 110 defines two or more separated compartments: in this embodiment, a first compartment 102 and a second compartment 104. The first and second compartments 102, 104 are separated by an internal transverse wall 106. Although a substantially transparent entrapment chamber 110 is currently preferred and may be formed, for example, of a colored polymeric material, the entrapment chamber 110 may be alternatively translucent or opaque.

A first entry structure 120 is removably attached at a top end 112 of the entrapment chamber 110, providing insect access to the first compartment 102. Although various entry structures may be used, the currently preferred first entry structure shown in FIGS. 1-3 comprises a lid 122, a tapered guide 126, and an attachment fixture 132. The lid 122 attaches to the top end 112 of the entrapment chamber 110, for example by threadable attachment or friction fit. The lid 122 has a central aperture 124 that is disposed directly over the open large end 128 of the inverted cone-shaped tapered guide 126. The tapered guide 126 also has an open smaller distal end 130 that extends into the first compartment 102. The attachment fixture 132 includes a plurality of vertical panels 134 (three in this embodiment) that extend through slots 125 in the lid 122 and lockingly engage the tapered guide 126 through attachment apertures 127, to hold the tapered guide 126 against the lid 122. Therefore, in this embodiment, the first entry structure 120 is assembled by positioning the tapered guide 126 under the lid 122 with the attachment apertures 127 directly below the lid slots 125, and pressing the attachment fixture 132 through the slots 125 and into the attachment apertures 127.

The attachment fixture 132 includes an upper cap portion 136 that is fixed to the top end of the vertical panels 134, and may include a hanging nib 138 to accommodate a string, strap or the like such that the trap 100 may be hung, for example from a tree limb or building eave.

It will now be appreciated from the figures that the lid 122 and vertical panels 134 of the first entry structure 120 define three entryways into the tapered guide 126 and the first compartment 102. It is further contemplated that the first entry structure 120 may include a mechanism, such as an aperture, channel, opposed prongs, adhesive, bowl portion, or the like, for retaining an attractant, to preferentially attract a particular species of insect.

A second entry structure 140 is removably attached at a bottom end 114 of the entrapment chamber 110, providing insect access to the second compartment 104. Although various entry structures may be used in the present invention, as will be apparent to persons of skill in the art, a currently-preferred second entry structure will be described. The second entry structure shown in FIGS. 1-3 comprises a threaded lower lid 142 that engages a thread 116 on the entrapment chamber 110. The lower lid 142 includes a plurality of entry apertures 144 (three visible). A second tapered guide 146 is disposed with an open larger end 148 abutting the lower lid 142, and a smaller open end 150 extending into the second compartment 104. Preferably, both of the tapered guides 126 and 146 include a plurality of apertures 129, 149 respectively, that are sized to provide target insects with a perch and a sensory indicator of open space, but are too small to permit the target insect to pass therethrough.

The lower lid 142 also includes a cup portion 152 that may be used to retain, for example, a liquid attractant such as water or water with a chemical attractant. A retainer structure 154 comprising two upwardly-extending prongs is also provided that may be used, for example, to hold a solid attractant (not shown) or the like. Although liquid and solid attractants are believed to be most common, it will be appreciated by persons of skill in the art that other forms of attractant, for example semi-solid attractants (such as pastes or gels) or combinations thereof, may alternatively be used, and may be preferred for some applications. Of course various combinations of one or more of solid, liquid and other attractants may be utilized.

It will now be appreciated from the figures that the lower lid 142 entry apertures 144 define entryways into the second tapered guide 146 and the second compartment 104.

The trap 100 with the first entry structure 120 spaced apart from the second entry structure 140 provides longitudinally spaced entryways for trapping target insects in two separate compartments 102, 104. One or both of the entry structures 120, 140 may include attractant for target insects. If both of the entry structures 120, 140 include attractant, the attractants may be individually formulated and targeted to specific insects, whereby the trap may be used to entrap different species of insect.

In one embodiment the entryways defined by the first entry structure 120 are spaced at least six inches from the second entry structure 140 apertures 144, and more preferably at least eight inches from the entry apertures 144. However, it will be appreciated by persons of skill in the art that the spacing of the entryways may be different, for example the spacing may be selected based on the particular insects that are the intended targets of the trap, the particular attractant(s) intended to be used with the trap, and/or the intended location or mode for using the trap.

When separate attractants are provided in each of the compartments 102, 104, one plume will be produced from the first entry structure, and a second plume will emanate from the second entry structure 140. Near the trap 100 two attractant plumes will be spatially separate, one plume emanating from near the top of the trap 100, and the second plume emanating from near the bottom of the trap 100. Therefore, it is contemplated that the attractants may be selected such that a first target insect is preferentially attracted by the first plume to the first compartment 102, and a second target insect, which may be hostile to, or repulsed by, the first target insect, may be preferentially attracted by the second plume to the second compartment 104.

At a distance from the trap 100 the first and second plumes may mix and/or merge as they spread out due to convection and diffusion processes. With suitable attractants, the merged plumes may provide a synergistic effect attracting two or more target species of insects toward the trap 100. Because the mixed plume results from two different attractant sources, and emanate from spaced-apart passages, the resulting plume will be larger than a plume from a single attractant source. The larger plume will therefore be effective at longer distances. In the larger plume the antagonistic insects may remain far enough apart to preclude one insect species from repulsing the other away from the trap 100. As the target insects approach nearer the trap 100, they will tend towards the preferred attractant at opposite ends of the trap, whereby one insect species will not interfere with trapping a second insect species. It will also be appreciated that the expired or expiring insects of one species will remain in one compartment spaced away from the entryway of the other compartment, so trapped insects from one species should not be in a position to repulse insects from the other species.

The trap 100 therefore allows two or more attractant releasing sources and collection chambers in a single trap. The trap 100 also reduces or eliminates antagonistic effects between attractants (food attractants, kairomones, insect sex or aggregation pheromones) for multiple insect species; thus one trap can catch more than one target insect species, eliminating the need for multiple individual traps (one for each species) that would be required to achieve the same efficacy.

The trap 100 provides for the combination of wet and dry traps in a single trap. For example, the second compartment 104 might be used as a wet trap, i.e., loaded with a certain amount of water, with or without attractants. The water itself can be either an attractant for some insects and/or a drowning agent. Water vapor may also function as a controlled release substrate for some water-dissolvable, highly volatile chemical attractant (e.g. short chain acids). The first compartment 102 might then be used as a dry trap, especially good for attractant chemicals that are heavier than air.

In one embodiment, an attractant generating a plume that is heavier than air is provided in the first compartment 102, and an attractant generating a plume that is lighter than air or neutrally buoyant is provided in the second compartment, such that the plumes will mix at a distance from the trap 100.

It is contemplated that the top and bottom entryways could be of the same or different design, depending on the insects of interest to be trapped in different chambers. The two compartments may be symmetrical (i.e. same size or length/diameter) or asymmetrical. For example the first chamber may be longer than the second chamber, or vice versa.

Exemplary and beneficial uses of this new trap 100 are as follows:

a. A universal trap for various species, including but not limited to insects of order Hymenoptera, such as yellow jacket, wasps and hornets. Both sugar lures and heptyl butyrate related lures can be set up in different compartments of the same trap, and catch most of (if not all) the yellow jacket, paper wasp and hornet species in any region.

b. A universal trap for different garden moth insects in different regions and seasons: both sugar lure (Acetid acid/3-methyl-1-butanol) for Noctuidae and floral lure (Phenylacetaldhyde/β-Myrcene/Benzyl Acetate/Methyl Salicylate/Methyl-2methoxy Benzoate) for looper moths will be able to put in different chambers (sugar lure on the top, and floral attractant on the bottom chamber) of the same trap.

c. A universal trap for sympatric moths or other insect species that use different antagonistic semiochemical components (e.g., pheromones) or different antagonistic semiochemical component ratios (for reproductive isolation): separation of these antagonistic semiochemical systems in different chambers of the same trap might reduce or eliminate the antagonistic effects for both species. Such antagonistic effect has been reported for many species such as: (i) the codling moth (*Cydia pomonella*) with the summer fruit tortrix moth (*Adoxophyes orana*) (Potting et al., Journal of Comparative Physiology A: Neuroethology, Sensory, Neural, and Behavioral Physiology 185:419-425, 1999); (ii) four European small ermine moths (Yponomeutidae) (Lofstedt & Van de Pers, JCE 11:649-666, 1985); (iii) *Helicoverpa zea* with three leliothine moth species (Baker et al., Annals of the New York Academy of Sciences 855:511-513, 1998); (iv) *Autographa gamma* (L.) with *Trichoplusia ni*, or *Chrysodeixis chalcities* (Esp.) (Mazor & Dunkelblum, JCE 18:2373-2384, 1992); (v) *Helicoverpa armigera* (Hubner) with *H. assulta* (Guenee) (Noctuidae) (Ming et al., Journal of Insect Physiology 53:170-178, 2007); (vi) *Choristoneura rosaceana* with *Pandemis limitata* (both from Tortricidae) (Evenend et al., JCE 25:501-517, 1999); and (vii) several Ips bark beetle species in Eurasia (Kohnle et al., Entomologia Experimentalis et Applicata 49:43-53, 1988).

An advantage of a trap as disclosed herein, over conventional insect traps, is that a single trap may be used for multiple species of insects, reducing the overall costs by reducing the number of traps required and easing the task of emptying and replenishing attractant in the traps. A single trap may also be significantly less aesthetically objectionable than multiple traps. For example, in a garden or in a recreational area it may be undesirable to deploy different traps for different species of pests.

Figure 4:
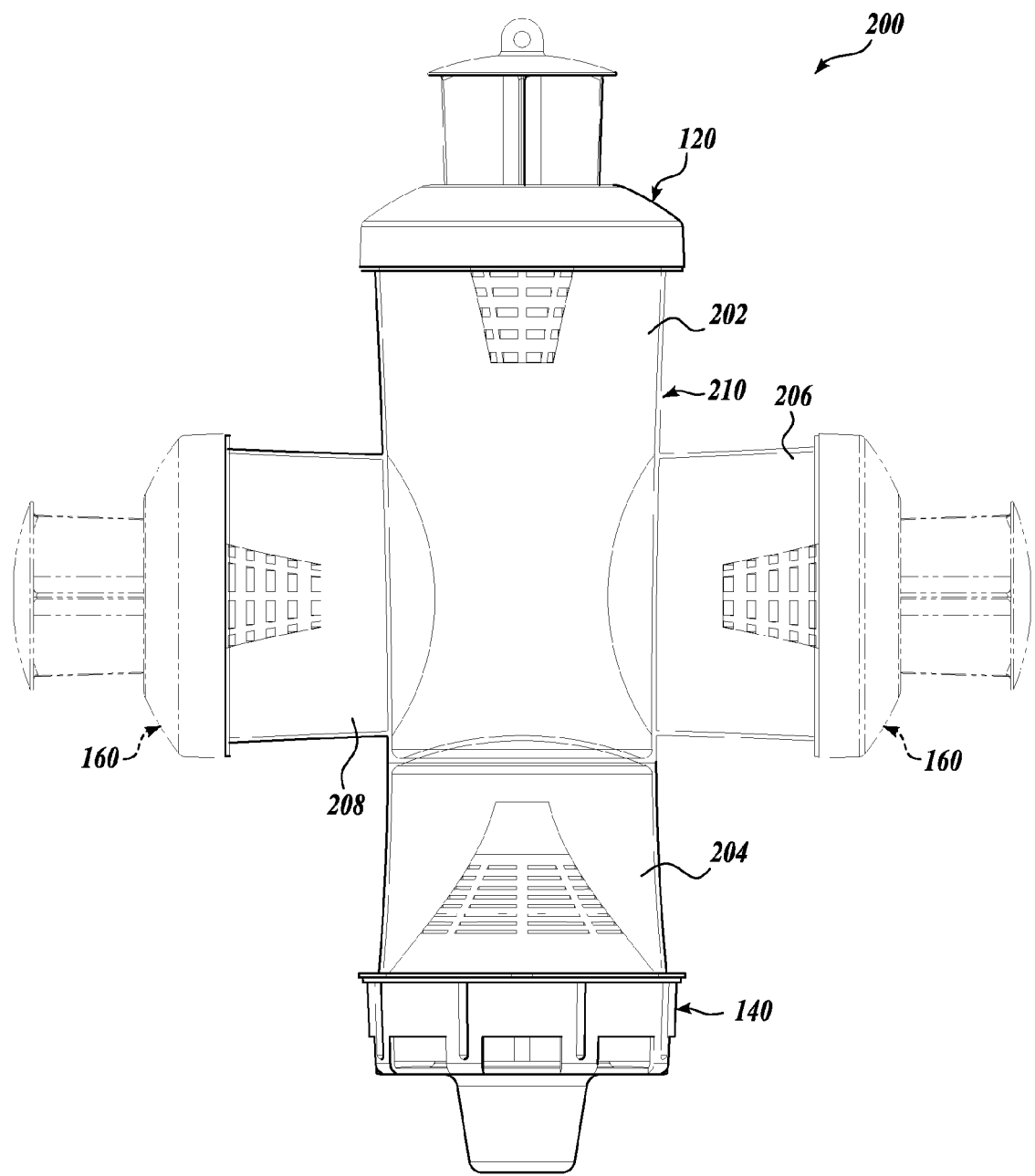
FIG. 4 is a side view of a second embodiment of a flying insect trap in accordance with the teachings of the present invention.

A second exemplary embodiment of a multi-compartment insect trap 200 is shown in FIG. 4. The insect trap 200 is similar to the insect trap 100 described above, and the description above for similar aspects will not be repeated here, for clarity and brevity. In the insect trap 200 the entrapment chamber 210 includes more than two separate compartments. In this embodiment, the entrapment chamber 210 is substantially cruciform in structure, and includes an upper first compartment 202, a lower second compartment 204, a right-side third compartment 206, and a left-side fourth compartment 208. Each of the four compartments 202-208 include a corresponding entry structure, which may be similar to either of the entry structures 120, 140 described above. The particular choice for the entry structures may depend on the particular target species for each compartment. In the embodiment shown in FIG. 4, the first entry structure 120 and second entry structure 140 are the same as described above. The left and right entry structures 160 are shown in phantom, and may be selected to accommodate a particular application.

In the insect trap 200 the right and left compartments 206, 208 are closed at their distal end by the outer wall of the upper first compartment 202. For example, the right and left compartments 206, 208 may be affixed to the upper first compartment 202 using a suitable adhesive. Alternatively, entire entrapment chamber 210 may be formed as a unitary structure having internal plates or other structure separating the individual compartments. For example the entrapment chamber 210 may be formed from two essentially identical halves joined along a seam.

Figure 5:
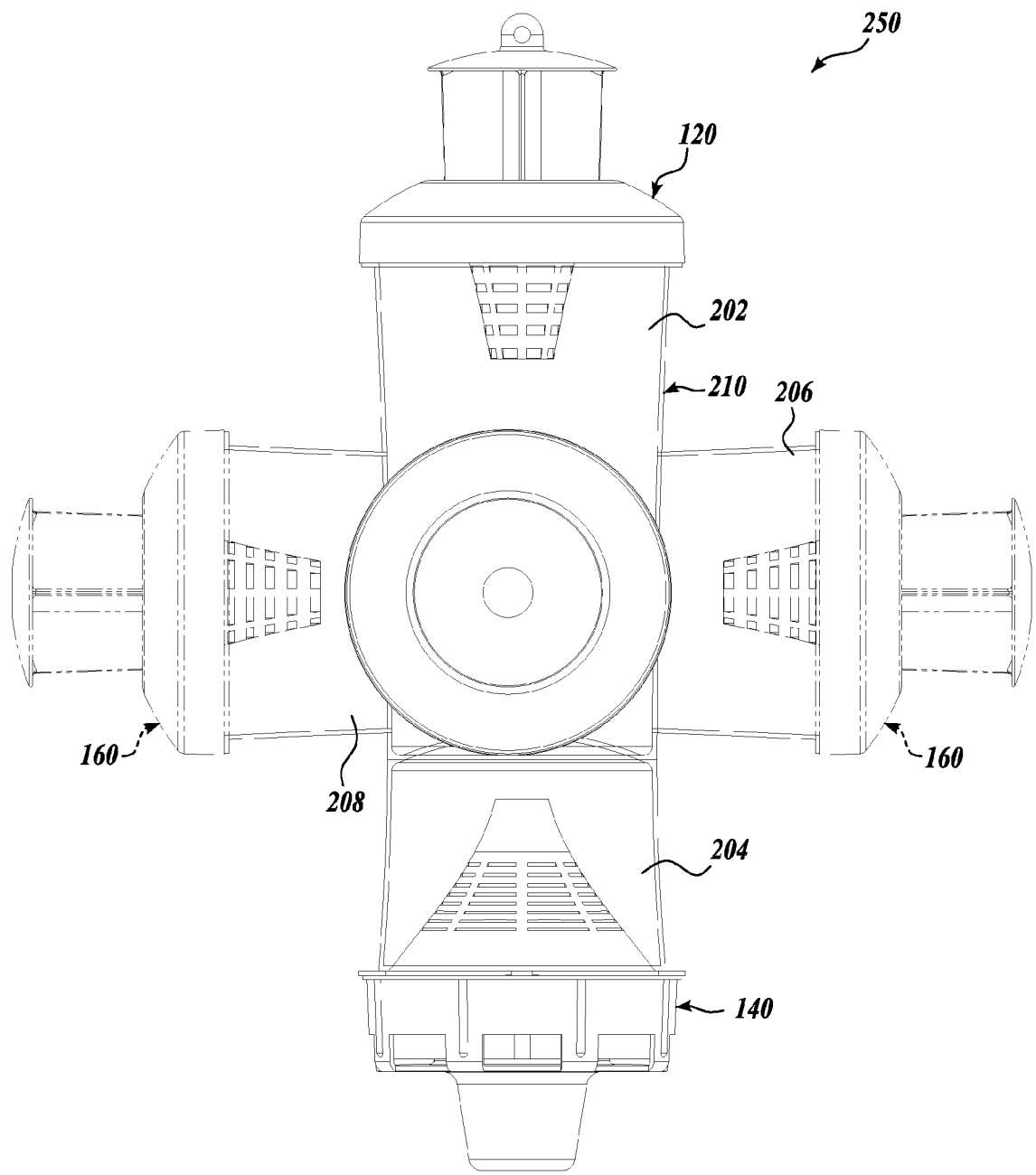
FIG. 5 is a side view of a third embodiment of a flying insect trap in accordance with the teachings of the present invention.

A similar multi-compartment insect trap 250 with compartments disposed along three generally orthogonal axes, and having six compartments and six spaced apart entryways is shown in FIG. 5 (only five compartments visible). Clearly, an insect trap in accordance with the present invention may be designed with an arbitrary number of separate compartments and spaced apart entryways. The attractant for each of the compartments/entryways, as well as the entryway structure, may be independently selected to suit a particular application.

Several currently-preferred multi-compartment insect traps are disclosed and described above. It will be readily apparent to persons of skill in the art that various changes to the disclosed embodiments may be made without departing from the present invention.

For example, particular insect species will be more likely to enter entryways or entry apertures that are oriented at an angle other than vertical or horizontal, e.g., 30° or 45°, and it is specifically contemplated that traps according to the present embodiment may utilize such angled entryways. The generally axisymmetric shape of the entrapment chambers and related structure is also not critical to the trap, and it is contemplated that suitable traps may be constructed in other shapes, including shapes intended to be more attractive to target insects or traps intended to be more aesthetically suitable in a particular setting. Similarly, the trap may be substantially opaque, rather than transparent or translucent. It is contemplated that traps of the present invention may alternatively be constructed to be installed differently, for example the lower structure may be provided with a stake such that the trap can be staked into the ground, or provided with a stand or legs for placement on a surface, or provided with mounting hardware for mounting to other natural or manmade structures. These and other variations will be readily apparent to artisans in the field.

Suitable attractants and entryway structures include, but are clearly not limited to, those disclosed in the patents and applications incorporated by reference above.

While illustrative embodiments have been illustrated and described, it will be appreciated that various changes can be made therein without departing from the spirit and scope of the invention.

The embodiments of the invention in which an exclusive property or privilege is claimed are defined as follows:

1. An insect trap comprising:
   an entrapment chamber comprising a first compartment, a second compartment disposed over the first compartment and a transverse wall separating the first compartment from the second compartment, the entrapment chamber having an open first distal end and an open second distal end, and wherein trapped insects cannot travel between the first and second compartments;
   a first entry structure that is removably attached to the open first distal end of the entrapment chamber, the first entry structure defining a first plurality of entry apertures for insect access directly to the first compartment; and
   a second entry structure that is removably attached to the open second distal end of the entrapment chamber, the second entry structure defining a second plurality of entry apertures for insect access directly to the second compartment.

2. The insect trap of claim 1, wherein the first entry structure is spaced at least six inches from the second entry structure.

3. The insect trap of claim 1, wherein the first compartment contains a first insect attractant that generates a first attractant plume that emanates from the first entry structure.

4. The insect trap of claim 3, wherein the second compartment contains a second insect attractant that generates a second attractant plume that emanates from the second entry structure.

5. The insect trap of claim 4, wherein the first insect attractant is targeted to a different species of insect than the second insect attractant.

6. The insect trap of claim 4, wherein the first insect attractant is liquid and the second insect attractant is solid.

7. The insect trap of claim 4, wherein the first attractant plume mixes with the second attractant plume a distance from the insect trap.

8. The insect trap of claim 1, wherein the second entry structure incorporates a cup adapted for retaining a liquid attractant.

9. The insect trap of claim 1, further comprising a first tapered guide having a large open proximal end that overlies the first plurality of entry apertures in the first entry structure, and a small open distal end.

10. The insect trap of claim 9, wherein the first tapered guide further comprises a plurality of apertures that are sized to provide a target insect with a perch and a sensory indicator of open space, but are too small to permit the target insect to pass therethrough.

11. The insect trap of claim 1, wherein the first entry structure is threadably attached to the open first distal end of the entrapment chamber.

12. The insect trap of claim 1, wherein the entrapment chamber comprises more than two compartments, each compartment having a separate entry structure.

13. The insect trap of claim 1, further comprising a tapered guide having a large proximal end and a small distal end, wherein the first entry structure comprises a lid having an aperture and a plurality of panels that extend through the lid aperture to engage the tapered guide proximal end.

14. An insect trap with spaced entryways comprising:
   an entrapment chamber defining a plurality of compartments, each compartment having an open distal end and a closed end, wherein trapped insects cannot travel between the plurality of compartments;
   a plurality of entry structures that are each removably attached to the open distal end of an associated one of the plurality of compartments, the entry structures defining an entry aperture for insect access directly to the associated compartment; and
   a plurality of conical tapered guides having a large open end and a small open end, each tapered guide being disposed in an associated one of the plurality of compartments;
   wherein the large open end of each of the plurality tapered guides is disposed over the entry aperture of the associated entry structure.

15. The insect trap of claim 14, wherein each of the plurality of entry structures are spaced at least six inches from the other entry structures.

16. The insect trap of claim 14, wherein at least one of the plurality of compartments contains a first insect attractant that generates a first attractant plume that emanates from the insect trap.

17. The insect trap of claim 16, wherein at least a second one of the plurality of compartments contains a second insect attractant that generates a second attractant plume that emanates from the insect trap.

18. The insect trap of claim 17, wherein the first insect attractant is targeted to a different species of insect than the second insect attractant.

19. The insect trap of claim 17, wherein the first insect attractant is liquid and the second insect attractant is solid.

20. The insect trap of claim 17, wherein the first attractant plume mixes with the second attractant plume a distance from the insect trap.

21. The insect trap of claim 14, wherein the plurality of conical tapered guides further comprises a plurality of apertures that are sized to provide a target insect with a perch and a sensory indicator of open space, but are too small to permit the target insect to pass therethrough.

22. The insect trap of claim 14, wherein the insect trap includes a hanging nib, such that the insect trap is operable to trap flying insects.

* * * * *